US010651679B2

(12) United States Patent
Liang et al.

(10) Patent No.: US 10,651,679 B2
(45) Date of Patent: May 12, 2020

(54) WIRELESS INPUT DEVICE AND POWER MANAGEMENT METHOD OF THE SAME

(71) Applicant: Wistron Corp., New Taipei (TW)

(72) Inventors: Chen-Yi Liang, New Taipei (TW); Chun-Kuan Liu, New Taipei (TW)

(73) Assignee: WISTRON CORP., New Taipei (TW)

( * ) Notice: Subject to any disclaimer, the term of this patent is extended or adjusted under 35 U.S.C. 154(b) by 195 days.

(21) Appl. No.: 15/853,490

(22) Filed: Dec. 22, 2017

(65) Prior Publication Data

US 2019/0074712 A1    Mar. 7, 2019

(30) Foreign Application Priority Data

Sep. 5, 2017 (TW) .............................. 106130280 A (51) Int. Cl.
*H02J 9/06* (2006.01)
*G06F 1/32* (2019.01)
(Continued)

(52) U.S. Cl.
CPC .................. *H02J 9/06* (2013.01); *G06F 1/30* (2013.01); *G06F 1/3259* (2013.01);
(Continued)

(58) Field of Classification Search
CPC .... H02J 9/06; H02J 7/045; H02J 7/345; H02J 7/0068; G06F 1/3259; H01M 10/44
See application file for complete search history.

(56) References Cited

U.S. PATENT DOCUMENTS 7,764,213 B2    7/2010 Bartling et al.

FOREIGN PATENT DOCUMENTS

CN    101738544 A    6/2010
CN    203324937    *    4/2013    .............. H02J 7/045
(Continued)

OTHER PUBLICATIONS

Translation for CN 203324937 (Year: 2013).*
(Continued)

*Primary Examiner* — Rexford N Barnie
*Assistant Examiner* — Elim Ortiz
(74) *Attorney, Agent, or Firm* — McClure, Qualey & Rodack, LLP (57) ABSTRACT

This invention provides a wireless input device, including a primary battery set, a backup battery, an electricity generating device, an energy-storage/charging device, and a switching device. The primary battery set provides electricity to the wireless input device. The backup battery provides electricity to the wireless input device when the primary battery set does not have sufficient electricity. The electricity generating device generates electricity in response to clicking/pressing operations to the wireless input device. The energy-storage/charging device is coupled to the backup battery and the electricity generating device. The energy-storage/charging device stores the electricity generated by the electricity generating device and charges the backup battery when the stored electricity has reached a predetermined volume. The switching device is coupled to the primary battery set and the backup battery. The switching device selects the primary battery set or the backup battery to provide electricity to the wireless input device.

11 Claims, 8 Drawing Sheets

(51) Int. Cl.
    *H02J 7/04*           (2006.01)
    *H01M 10/44*        (2006.01)
    *G06F 1/30*           (2006.01)
    *G06F 1/3234*       (2019.01)
    *H02J 7/34*           (2006.01)

(52) U.S. Cl.
    CPC ............ *H01M 10/44* (2013.01); *H02J 7/045* (2013.01); *H02J 7/345* (2013.01)

(56) References Cited

FOREIGN PATENT DOCUMENTS

| | | | |
|---|---|---|---|
| CN | 203324937 U | | 12/2013 |
| TW | 200625751 | * | 7/2006 |
| TW | 200625751 A | | 7/2006 |

OTHER PUBLICATIONS

Translation of TW 200625751A (Year: 2006).*
Chinese language office action dated Jun. 19, 2018, issued in application No. TW 106130280.

* cited by examiner

WIRELESS INPUT DEVICE AND POWER MANAGEMENT METHOD OF THE SAME

CROSS REFERENCE TO RELATED APPLICATIONS

This Application claims priority of Taiwan Patent Application No. 106130280, filed on Sep. 5, 2017, the entirety of which is incorporated by reference herein.

BACKGROUND OF THE INVENTION

Field of the Invention

The present invention is related to a wireless input device, and in particular to a wireless input device with multiple electrical power sources and its power management method.

Description of the Related Art

Comparing to traditional wired input devices, wireless input devices, such as a wireless mouse or a wireless keyboard, can provide users with a more convenient and flexible input method for operating computers. But a wireless input device requires batteries to supply electricity and cannot be used to operate the computer when the batteries run out of power. Under these circumstances, a user can only operate the computer via the wireless input device after replacing the batteries. Batteries are generally sold in packets where each packet may contain one or multiple batteries. If a wireless input device only requires a single battery to supply electricity, the other unused batteries may be wasted, or naturally become depleted over time.

BRIEF SUMMARY OF THE INVENTION

To address the above issues, this invention provides a wireless input device and its power management method. The wireless input device receives and properly adjusts the power from multiple electrical power sources (batteries) according to the power management method. One exemplary embodiment of the present invention provides a wireless input device comprising a primary battery set, a backup battery, an electricity generating device, an energy-storage/charging device, and a switching device. The primary battery set provides electricity to the wireless input device. The backup battery provides electricity to the wireless input device when the primary battery set does not have sufficient electricity to supply the wireless input device. The electricity generating device generates electricity via clicking/pressing operations to the wireless input device. The energy-storage/charging device is coupled to the backup battery and the electricity generating device. The energy-storage/charging device stores the electricity generated by the electricity generating device, and charges the backup battery when the stored electricity reaches a predetermined level. The switching device is coupled to the primary battery set and the backup battery. The switching device selects either the primary battery set or the backup battery to provide electricity to the wireless input device.

The wireless input device described above further comprises a power control device. The primary battery set comprises a first battery and a second battery. The power control device is coupled to the first battery and the second battery. The power control device outputs the electricity of the first battery, and when the first battery does not have sufficient electricity, the power control device outputs the electricity of the second battery.

The switching device described above is a manual switch. When the first battery and the second battery do not have sufficient electricity, the manual switch is switched from a first position to a second position to select the backup battery to provide electricity.

The wireless device described above further comprises a driving device. When the manual switch is in the second position, the driving device moves the manual switch from the second position to the first position to select the primary battery set to provide electricity after the first battery and the second battery are replaced by new batteries.

Another exemplary embodiment of this invention provides a power management method suitable for the wireless input device described above. The method comprises: detecting the voltage of the primary battery set; selecting the backup battery to supply electricity via the switching device when the primary battery set does not have sufficient electricity; and selecting the new primary battery set to provide electricity via the switching device when the backup battery is providing electricity and the primary battery set has been replaced by the new primary battery set.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
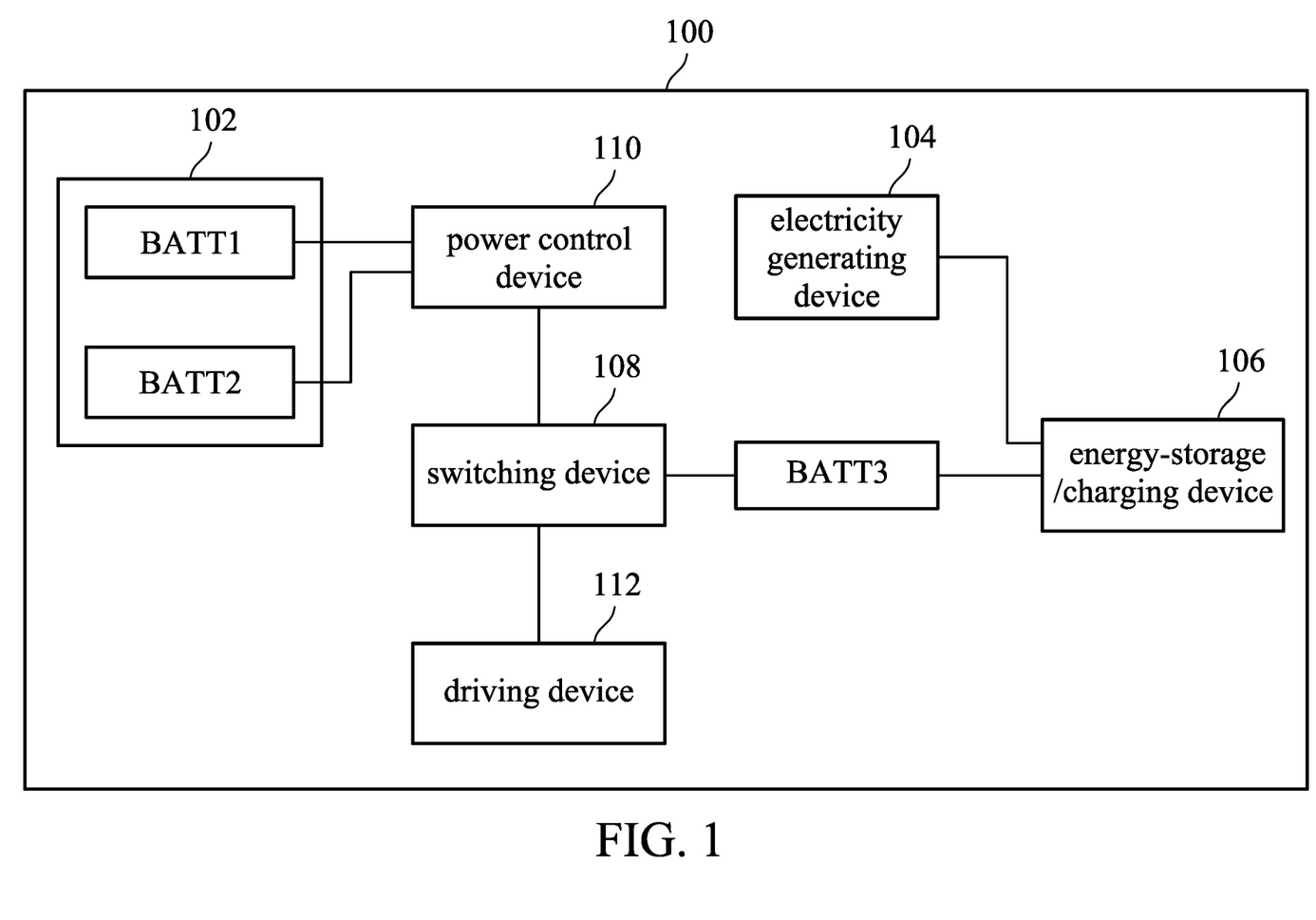
FIG. 1 is a schematic diagram illustrating an exemplary circuit of a wireless input device of an embodiment of the present invention.

FIG. 1 shows a schematic diagram illustrating a wireless input device of an exemplary embodiment of the present invention. A wireless input device 100 comprises a primary battery set 102, a backup battery BATT3, an electricity generating device 104, an energy-storage/charging device 106, a switching device 108, a power control device 110 and a driving device 112. In this embodiment, the wireless input device 100 is for example, a wireless mouse for computer applications, but not limited to such. It can be any device which operates data-input or control to a computer via wireless methods.

The primary battery set 102 comprises a first battery BATT1 and a second battery BATT2, which is the primary power source of the wireless input device 100. The primary battery set 102 provides electricity to the wireless input device 100 when the first battery BATT1 or the second battery BATT2 has sufficient electricity, and the backup battery BATT3 provides electricity to the wireless input device 100 when the first battery BATT1 and the second battery BATT2 do not have sufficient electricity. The backup battery BATT3 allow users to continuously use the wireless input device 100 before the low-powered first battery BATT1 and second battery BATT2 are replaced by new ones. The backup battery BATT3 can be for example, a rechargeable battery which can store the electricity generated by the electricity generating device 104. Electricity of the backup battery BATT3 ensures a required power supply is applied to the wireless input device 100 when the primary battery set 102 does not have sufficient electricity.

In one embodiment, the primary battery set 102 comprises two battery slots (not drawn in figures) independently disposed for placing the first battery BATT1 and the second battery BATT2.

When a user operates the wireless input device 100, for example, clicks or presses the buttons or scrolls of the wireless input device 100, the electricity generating device 104 transforms the mechanical energy generated through the clicking/pressing operations into electricity and transmits the generated electricity to the energy-storage/charging device 106. Wherein the electricity generating device 104 can be a piezoelectric device, an electricity generating motor or any other device that can transform mechanical energy to electricity.

The energy-storage/charging device 106 is coupled to the backup battery BATT3 and the electricity generating device 104, and temporarily stores the electricity generated by the electricity generating device 104. When the stored electricity reached a predetermined value, the energy-storage/charging device 106 charges the backup battery BATT3 to ensure that the backup battery BATT3 has sufficient electricity.

The power control device 110 is coupled to the first battery BATT1 and second battery BATT2. The functionality of the power control device 110 is for example, outputting the electricity of the first battery BATT1 by default and outputting the electricity of the second battery BATT2 when the first battery BATT1 does not have sufficient electricity. The power control device 110 sequentially selects the first battery BATT1 and second battery BATT2 to provide electricity, whereby the wireless input device 100 can efficiently manage the power usage of the first battery BATT1 and second battery BATT2 of the primary battery set 102. In this embodiment, the first battery BATT1 and second battery BATT2 are two independent battery units, but the first battery BATT1 and second battery BATT2 can also be within a single package unit in some applications.

The switching device 108 is coupled to the backup batter BATT3 and the output of the power control device 110. The switching device 108 selects the backup batter BATT3 or the output of the power control device 110 as the power source for the wireless input device 100. The switching device 108 can be switched between a first position and a second position. When the switching device 108 is in the first position, the output of the power control device 110 provides the electricity for the wireless input device 100 through the switching device 108. When the switching device 108 is in the second position, the backup battery BATT3 provides the electricity for the wireless input device 100 through the switching device 108. When the wireless input device 100 cannot be operated due to power depletion/insufficiency of the primary battery set 102, the switching device 108 can be switched from the first position to the second position to select the backup battery BATT3 to provide electricity to the wireless input device 100.

The wireless input device 100 can optionally be equipped with a driving device 112 which is connected to the switching device 108. When the switching device 108 is in the second position and the primary battery set 102 has been replaced by a new primary battery set, the driving device 112 moves the switching device 108 from the second position to the first position to select the output of the power control device 110 (i.e., the primary battery set 102) to provide electricity. The driving device 112 can be a solenoid valve. The voltage of the new primary battery set 102 can drive the solenoid valve to perform a one-time push movement which moves the switching device 108 from the second position back to the first position.

Also, when the first battery BATT1 and the second battery BATT2 both have insufficient electricity, the driving device 112 can be configured to move the switching device 108 from the first position to the second position to select the backup battery BATT3 as the power source. The wireless input device 100 sends out a user notification at the same time to notify the user to replace the primary battery set 102.

Figure 2:
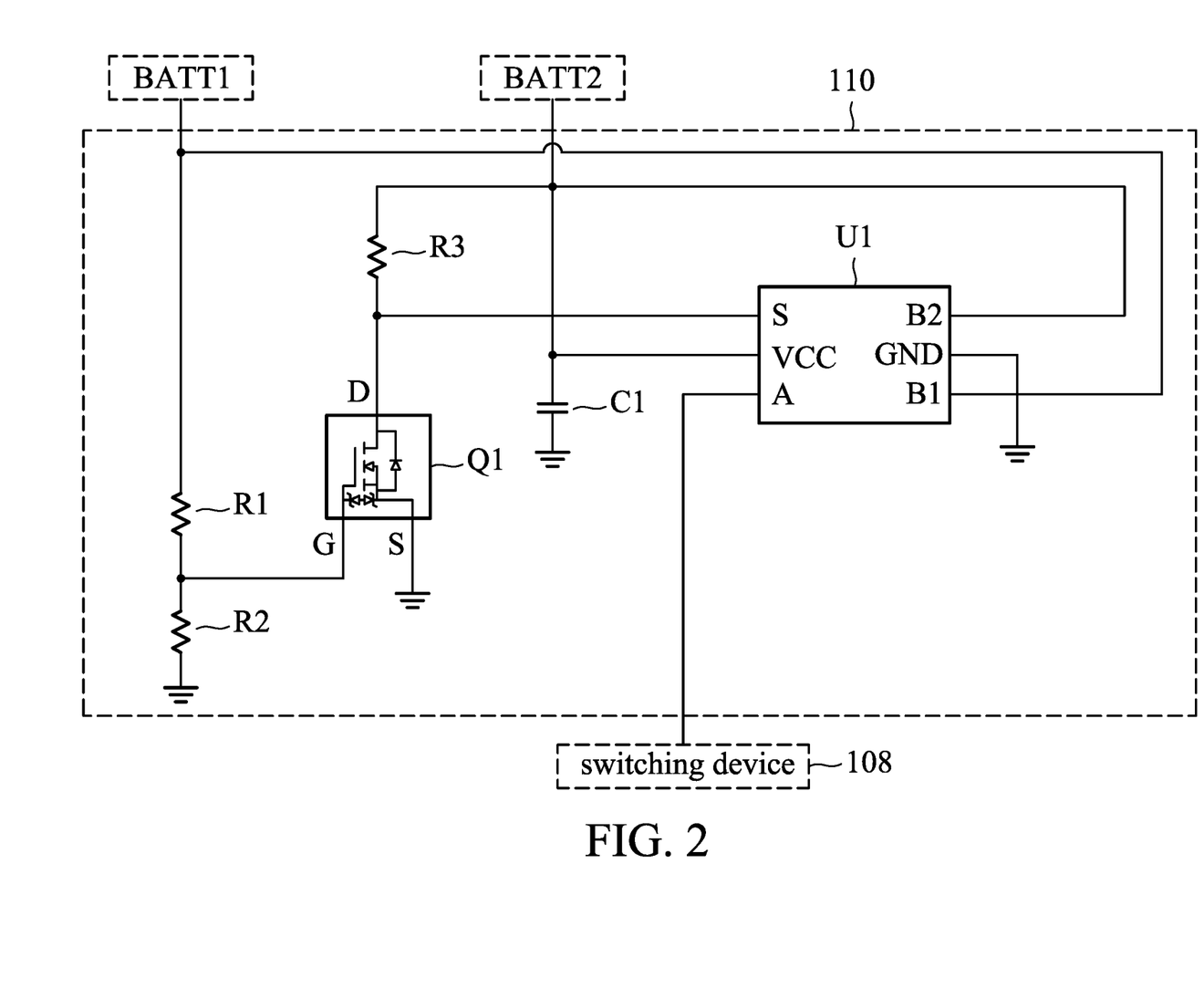
FIG. 2 is a schematic diagram illustrating an exemplary circuit of a power control device of a wireless input device of an embodiment of the present invention.

FIG. 2 shows a schematic diagram illustrating an exemplary circuit of the power control device 110 of FIG. 1. As shown in FIG. 2, the power control device 110 comprises a N-type Metal-Oxide-Semiconductor Field-Effect Transistor (hereinafter, referred to as NMOS transistor) Q1, an output selection circuit U1, a capacitor C1 and three resistors R1~R3. The source S of the NMOS transistor Q1 is connected to a ground, the drain D of the NMOS transistor Q1 is connected to the resistor R3 and the pin S of the output select circuit U1, and the gate G of the NMOS transistor Q1 is connected to the resistors R1 and R2. The pin S of the output selection circuit U1 is connected to the drain D of the NMOS transistor Q1 and the resistor R3. The connections of the pins of the output selection circuit U1 are organized as follows: the pin VCC is connected to the second battery BATT2 and the capacitor C1, the pin A is connected to the switching device 108, the pin B2 is connected to the second battery BATT2, the pin GND is connected to the ground, and the pin B1 is connected to the first battery BATT1. The pin A is used as the output terminal of the power control device 110.

The output selection circuit U1 controls the output of the pin A via determining the logic level of the pin S. If the logic level of the pin S is high, the output selection circuit U1 selects to output the electricity received at the pin B2 (i.e., the electricity from the second battery BATT2) to the pin A. If the logic level of the pin S is low, the output selection circuit U1 selects to output the electricity received at the pin B1, (i.e., the electricity from the first battery BATT1) to the pin A.

Consider the scenario which the first battery BATT1 has sufficient electricity, i.e., the output voltage level of the first battery BATT1 is high. Under this scenario, the voltage level of gate G of the NMOS transistor Q1 is also high and hence the NMOS transistor Q1 is turned on and thus the voltage level of the drain D is low. The pin S of the output selection circuit U1 is connected to the drain D, and its logic level is low. Since the logic level of drain D is low, the output selection circuit U1 selects to output the electricity received at the pin B1 (which is the electricity of the first battery BATT1) to the pin A to provide electricity to the wireless input device 100.

Consider the scenario which the first battery BATT1 has insufficient electricity but the secondary battery BATT2 has sufficient electricity, i.e., the output voltage level of the first battery BATT1 is low and the output voltage level of the second battery BATT2 is high. Under this scenario, the NMOS transistor Q1 is turned off. The pin S of the output selection circuit U1 is connected to the second battery BATT2 via the resistor R3, and its logic level is high. Hence the output selection circuit U1 selects to output the electricity received at the pin B2 (i.e., the electricity of the second battery BATT2) to the pin A to provide electricity to the wireless input device 100.

From the teaching above, it is known that when the first battery BATT1 has sufficient electricity, the power control device 110 outputs the electricity of the first battery BATT1. When the first battery BATT1 does not have sufficient electricity and the second battery BATT2 has sufficient battery, the power control device 110 outputs the electricity of the second battery BATT2.

Figure 3:
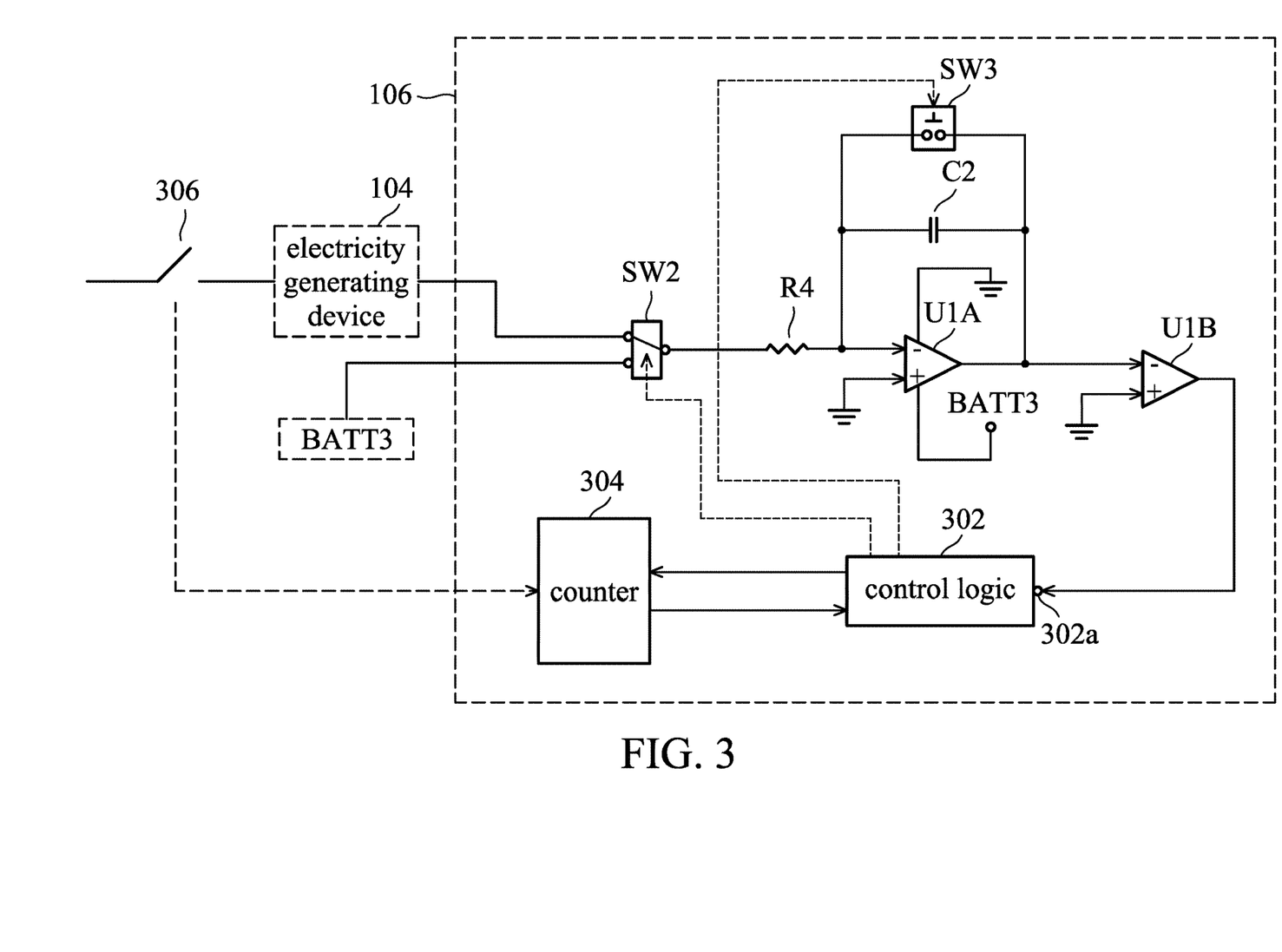
FIG. 3 is a schematic diagram illustrating exemplary circuits of an energy-storage/charging devices of wireless input devices of embodiments of the present invention.

FIG. 3. Shows an exemplary circuit of the energy-storage/charging device 106 of the wireless input device of FIG. 1. The energy-storage/charging device 106 comprises an Operational Amplifier (OPA) U1A, a comparator U1B, two switches SW2 and SW3, a capacitor C2, a resistor R4 a control logic 302 and a counter 304. Wherein the OPA UTA connects the capacitor C2 and the resistor R4 to form an integrator. The capacitor C2 is charged by the current from the resistor R4. The switch SW3 as a short-circuit switch connected to the two terminals of the capacitor C2. When the switch SW3 operates in a short-circuit state, the capacitor C2 discharges. The comparator U1B compares the output voltage of the OPA U1A with the ground voltage (i.e., 0V). When the capacitor C2 has been charged, the output voltage of the OPA U1A is negative and the output logic level of the comparator U1B is high. When the switch SW3 is in the short-circuit state, the capacitor C2 completely discharges its electricity such that the output voltage of the OPA U1A is 0V and thus the output logic level of the comparator U1B is low. The switch SW2 is a one-to-two coupling switch, which can couple the resistor R4 to the electricity generating device 104 or the backup battery BATT3 so as to perform switching between the energy-storage process and the charging process. The counter 304 counts the number of times that the button/scroll 306 of the wireless input device 100 has been pressed. The counted number can be reset to control the cycle of energy-storage/charging process. The control logic 302 is connected to the output of the comparator U1B and the counter 304, and controls the switches SW2 and SW3 according to the output voltage (logic level) of the OPA U1B and the counted number of the counter 304.

The energy-storage/charging process of the energy-storage/charging device 106 shown in FIG. 3 is described as follows. First, the control logic 302 sends out a control signal to short-circuit the switch SW3, and the capacitor C2 starts discharging to clear the remaining electricity within the capacitor C2. Along with the discharging process, the output voltage of the OPA U1A raises from a negative value to 0V. When the output voltage of the OPA U1A becomes 0V, the output logic level of the comparator U1B also switches from high to low. When the control logic 302 detects that the output logic level of comparator U1B is low, it determines that the capacitor C2 has finished discharging and is ready for the energy-storage process. The control logic 302 sends out another control signal to open-circuit the switch SW3, switches the switch SW2 to connect the electricity generating device 104 and the capacitor R4 of the energy-storage/charging device 106, and instructs the counter 304 to start recording the number of times the button/scroll 306 of the wireless input device 100 (such as a wireless mouse) has been pressed to start the energy-storage process. When the button/scroll 306 of the wireless input device 100 begins to be pressed, the counter 304 records the number of times pressed and the electricity generating device 104 generates current in response to the pressing to charge the capacitor C2. When the counted number of times pressed reaches a predetermined value, this also indicates that the electricity stored in the capacitor C2 has reached a predetermined value and the counter 304 sends a notice to the control logic 302 indicating that the energy-storage process is completed and the charging process to the backup battery BATT3 can be performed. The control logic 302 sends out a control signal to switch the switch SW2 to connect the backup battery BATT3 and the capacitor R4 of the energy-storage/charging device 106, and at this time the capacitor C2 starts charging the backup battery BATT3. During the process of the capacitor C2 charging the backup battery BATT3, the output voltage of the OPA U1A raises from a negative value to 0V. When the output voltage of the OPA U1A reaches 0V, the output logic level of the comparator U1B also switches from high to low. When the control logic 302 detects that the output logic level of comparator U1B is low, it determines that the capacitor C2 has finished discharging and sends out a command to reset the counter 304. At this time, the energy-storage/charging device 106 is ready to repeat the energy-storage/charging process.

Figure 4:
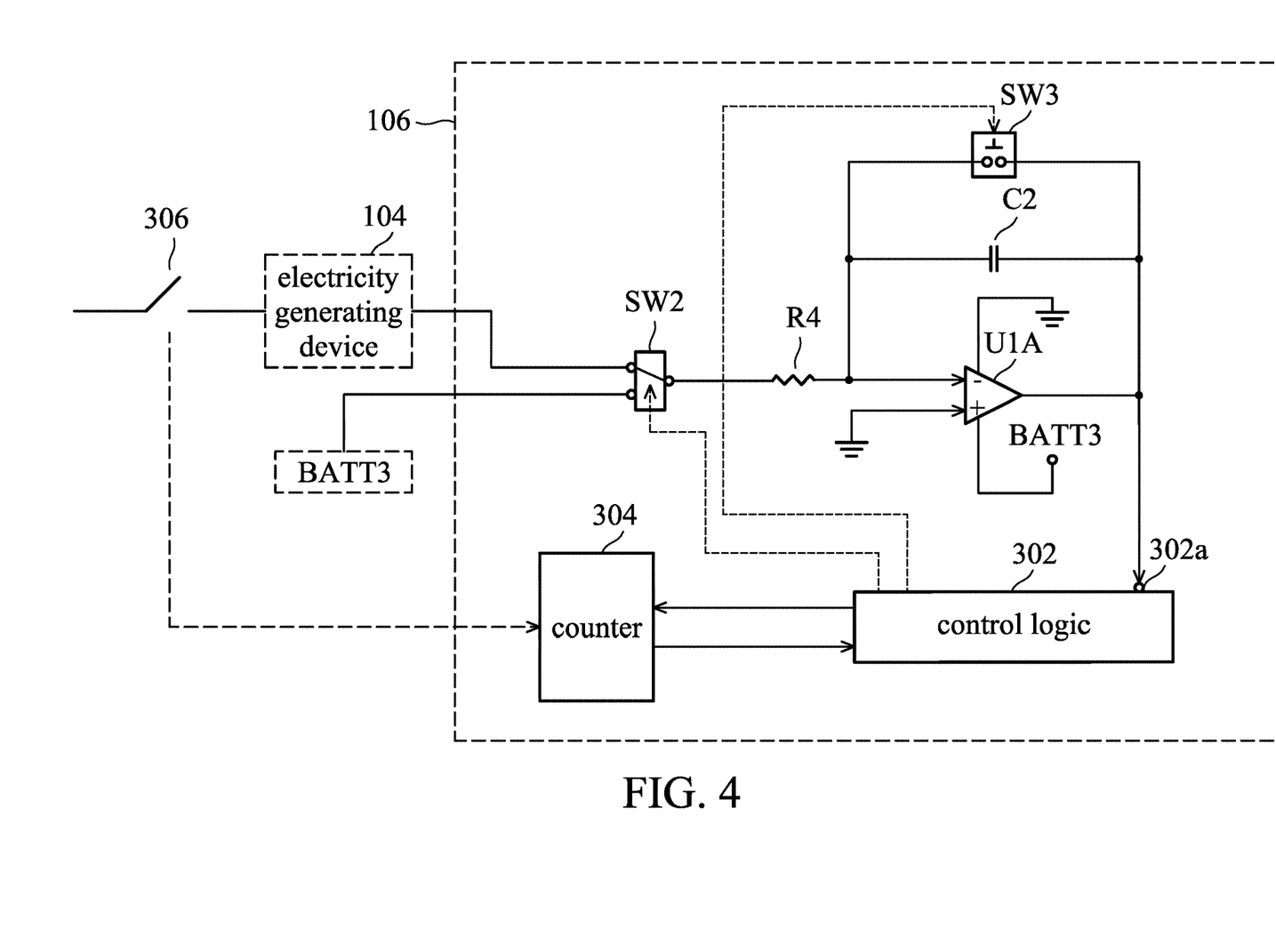
FIG. 4 is a schematic diagram illustrating exemplary circuits of an energy-storage/charging devices of wireless input devices of embodiments of the present invention.

FIG. 4. shows another exemplary circuit of the energy-storage/charging device 106 of the wireless input device 100. Wherein the difference between the energy-storage/charging device 106 of FIG. 3 and the energy-storage/charging device 106 of FIG. 4 is described as follows. The control logic 302 of the energy-storage/charging device 106 of FIG. 3 is connected to the output of the comparator U1B and determines whether the capacitor C2 has finished discharging according to the output logic level of the comparator U1B; the energy-storage/charging device 106 of FIG. 4 does not have the comparator U1B and the control logic 302 is connected to the output of the OPA U1A and determines whether the capacitor C2 has finished discharging according to the output voltage of the OPA U1A. When the output voltage of the OPA U1A is negative, it indicates that the capacitor C2 is not fully discharged, and when the output voltage of the OPA U1A is 0V, it indicates that the capacitor C2 is fully discharged and the energy-storage/charging device 106 is ready to repeat the energy-storage/charging process.

Figure 5:
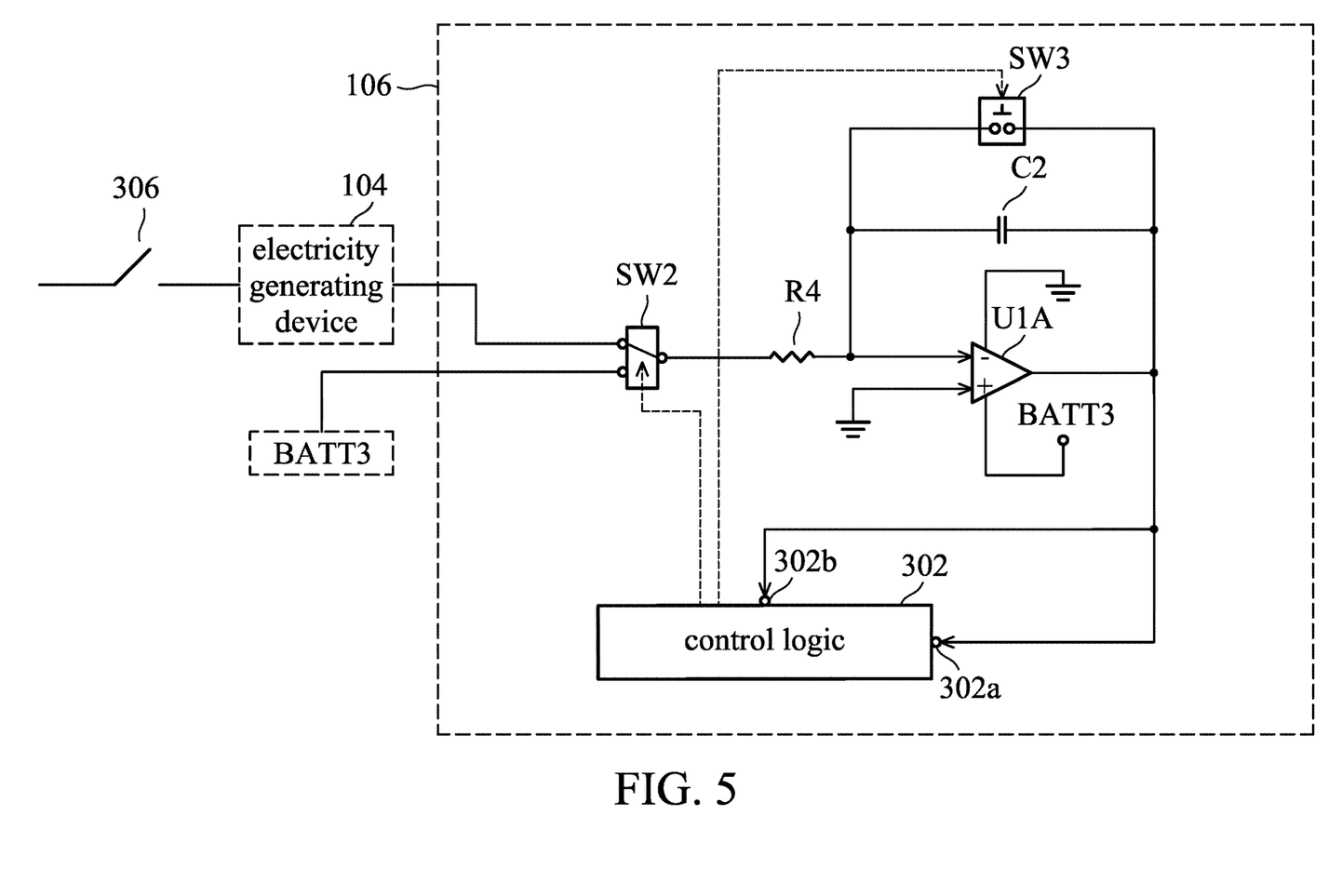
FIG. 5 is a schematic diagram illustrating exemplary circuits of an energy-storage/charging devices of wireless input devices of embodiments of the present invention.

FIG. 5. shows another exemplary circuit of the energy-storage/charging device 106 of the wireless input device 100. Wherein the difference between the energy-storage/ charging device 106 of FIG. 5 and the energy-storage/charging device 106 of FIG. 4 is that: the control logic 302 of the energy-storage/charging device 106 of FIG. 4 is connected to the counter 304 and determines whether the capacitor C2 is fully charged via the number of pressing counted by the counter 304; the energy-storage/charging device 106 of FIG. 5 does not have the counter 304 and the pins 302a and 302b are connected to the output of the OPA U1A and determines whether the capacitor C2 is fully charged according to the output voltage of the OPA U1A. When the pin 302a detects that the output voltage output of the OPA U1A reaches a predetermined value (e.g., a predetermined negative value voltage in this embodiment), the control logic 302 determines capacitor C2 is fully charged and the charging process to the backup battery BATT3 can be performed. When the pin 302b detects that the output voltage output of the OPA U1A reaches 0V, the control logic 302 determines capacitor C2 is fully discharged and the energy-storage/charging device 106 is ready to repeat the energy-storage/charging process.

Figure 6:
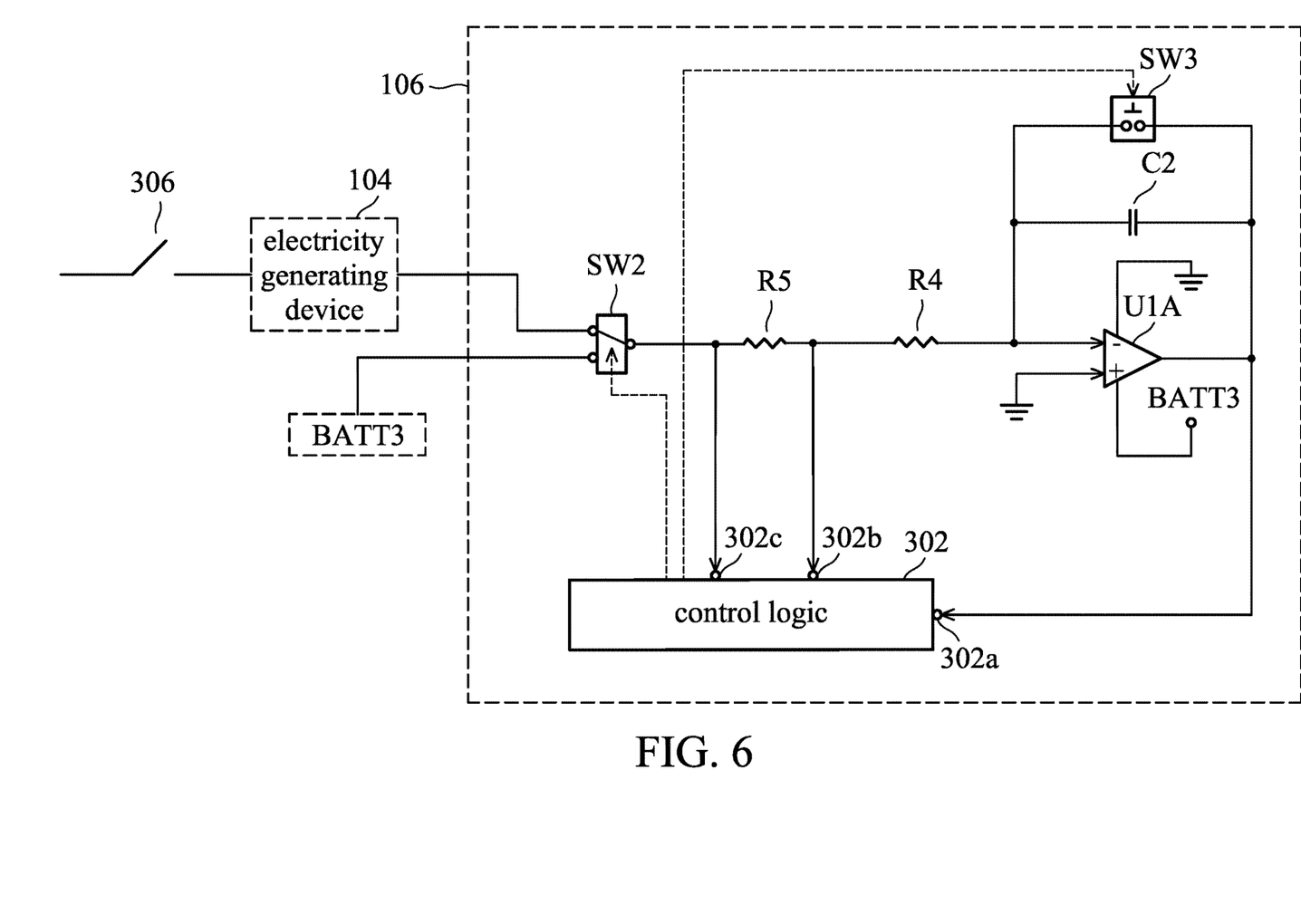
FIG. 6 is a schematic diagram illustrating exemplary circuits of an energy-storage/charging devices of wireless input devices of embodiments of the present invention.

FIG. 6 shows another exemplary circuit of the energy-storage/charging device 106 of the wireless input device 100. Wherein the difference between the energy-storage/charging device 106 of FIG. 6 and the energy-storage/charging device 106 of FIG. 5 is that: the energy-storage/charging device 106 of FIG. 6 does not have the counter 304 and it replaces the functionality of the counter 304 with a resistor R5 connected to the control logic 302. Wherein the two terminals of the resistor R5 are connected to the resistor R4 and the switch SW2, and the pins 302b and 302c of the control logic 302 are also connected to the two terminals of the resistor R5. When the button/scroll 306 is being pressed, the electricity generating device 104 correspondingly generates a current to charge the capacitor C2. When the current passes through the resistor R5, it generates an electrical potential difference at the two terminals of the resistor R5. When the electrical potential difference falls within a predetermined range, the control logic 302 recorded it as one pressing at its internal statistics. When the counted number of pressing reaches a predetermined value, it indicates that the capacitor C2 has finished charging and the charging process to the backup battery BATT3 can be performed.

Figure 7A:
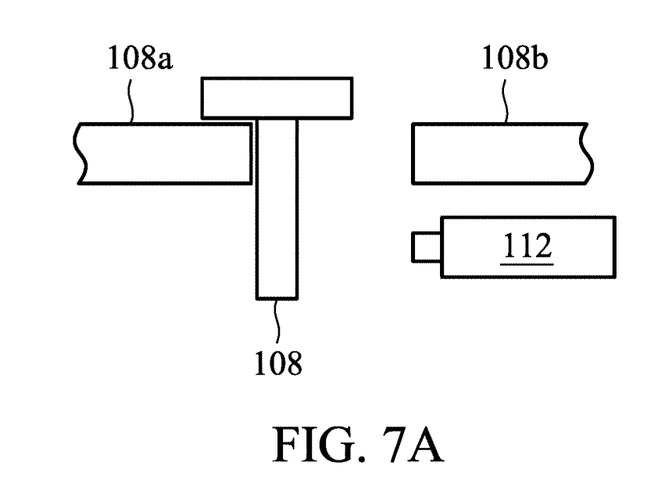
FIG. 7A is an exemplary operation of a switching device of a wireless input device of an exemplary embodiment of the present invention.
Figure 7B:
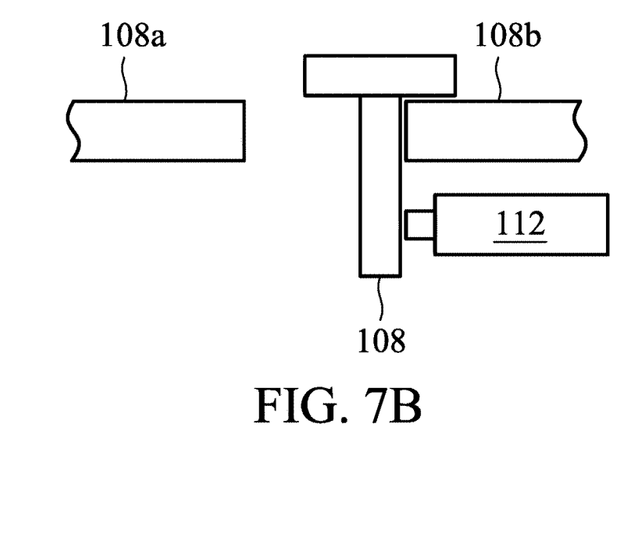
FIG. 7B is an exemplary operation of a switching device of a wireless input device of an exemplary embodiment of the present invention.
Figure 7C:
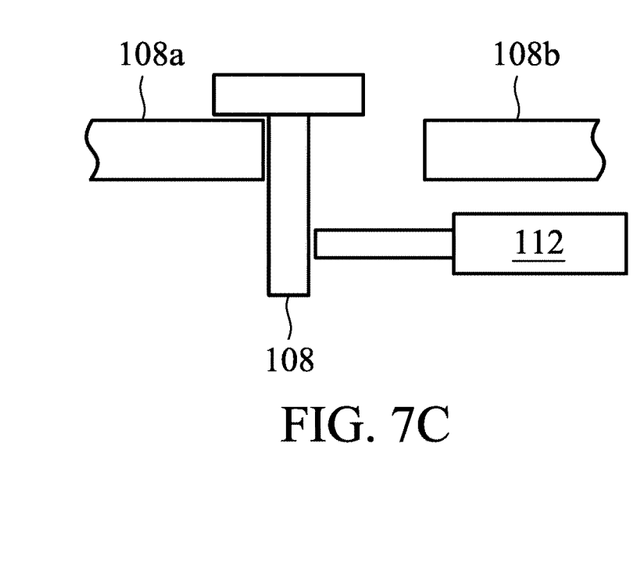
FIG. 7C is an exemplary operation of a switching device of a wireless input device of an exemplary embodiment of the present invention.

FIGS. 7A-7C are exemplary operations of the switching device 108 and the driving device 112 of the wireless input device 100. Here, the switching device 108 is a manual switch, for example. In FIG. 7A, the switching device 108 is in the first position 108a and the wireless input device 100 uses the output electricity of the power control device 110. In FIG. 7B, the primary battery set 102 does not have sufficient battery and the switching device 108 is switched to the second position 108b manually by a user and the wireless input device 100 uses the output electricity of the backup battery BATT3. In FIG. 7C, the power control device 110 detects that the primary battery set 102 has been replaced by a new primary battery set and switches the switching device 108 from the second position 108b to the first position 108a by the driving device 112 to select the output electricity of the power control device 110.

Figure 8:
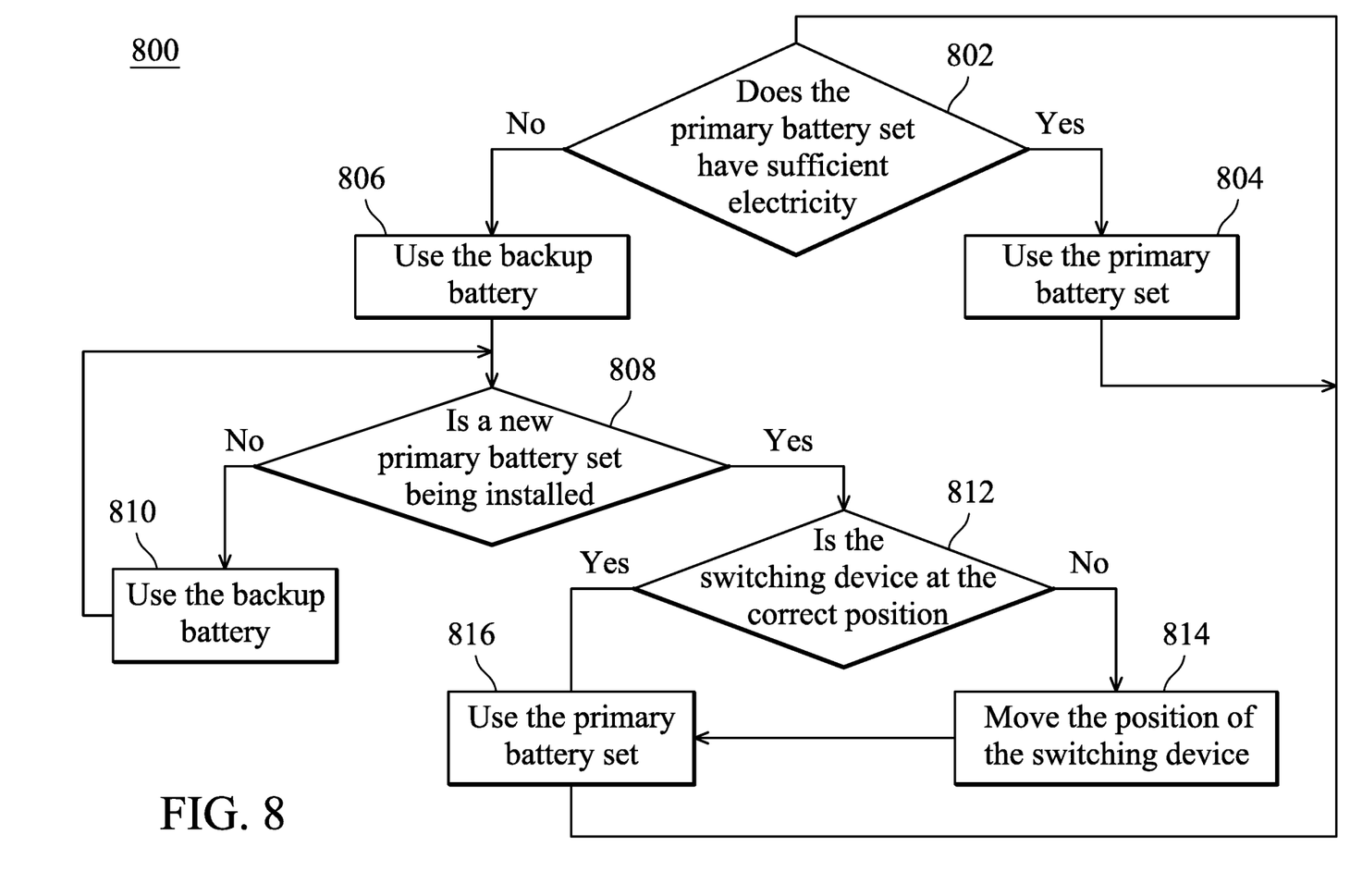
FIG. 8 is the power management method of a wireless input device of an embodiment of the present invention.

FIG. 8 is the power management method according to one embodiment of the present invention suitable for the wireless input device 100 described above. In step 802, it is first detected whether the primary battery set 102 still has sufficient electricity. Wherein the above described detection can be, for example, performed by the power control device 110 to detect whether the first battery BATT1 or the second battery BATT2 still have sufficient electricity. If the primary battery set 102 has sufficient electricity, the method proceeds to step 804; if the primary battery set 102 does not have sufficient electricity, the method proceeds to step 806.

In step 804, the primary battery set 102 keeps providing electricity to the wireless input device 100 and the method returns to step 802 in which the power control device 110 keeps monitoring the power status of the primary battery set 102.

In step 806, the switching device 108 is switched from the first position 108a to the second position 108b to select the backup battery BATT3 to provide electricity to the wireless input device 100. Wherein the switching can be performed by a user manually switching the switching device from the first position 108a to the second position 108b, or by a driving device 112 pushing the witch device 108 from the first position 108a to the second position 108b in another embodiment.

In step 808, it is checked whether the primary battery set 102 has been replaced by a new primary battery set. The replacing of the primary battery set 102 can be detected by the power control device 110 based on determining whether the voltage of first battery BATT1 and the second battery BATT2 have reached a predetermined value. If the primary battery set 102 has not been replaced, the method proceeds to step 810; if the primary battery set 102 has been replaced, the method proceeds to step 812.

In step 810, the backup battery BATT3 keeps providing electricity to the wireless input device 100 and the method returns to step 808 in which the power control device 110 keeps monitoring whether the primary battery set 102 has been replaced.

In step 812, it is checked whether the switching device 108 is in the first position 108a. If the switching device 108 is in the first position 108a, the method proceeds to step 816. If the switching device 108 is in the second position 108b, the method proceeds to step 814 in which the switching device 108 is moved from the second position 108b back to the first position 108a via the driving device 112. Afterwards, the method proceeds to step 816.

In step 816, the primary battery set 102 provides electricity to the wireless input device 100 and the method returns to step 802 in which the power control device 110 keeps monitoring the power status of the primary battery set 102.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A wireless input device, comprising:
   a primary battery set, providing electricity to the wireless input device;
   a backup battery, providing electricity to the wireless input device when the primary battery set does not have sufficient electricity to supply the wireless input device;
   an electricity generating device, generating electricity in response to clicking/pressing operations to the wireless input device;
   an energy-storage/charging device, coupled to the backup battery and the electricity generating device, storing the electricity generated by the electricity generating device, and charging the backup battery when the stored electricity reaches a predetermined value, wherein the energy-storage/charging device comprises an integrator and a control logic, a capacitor of the integrator stores the electricity generated by the electricity generating device, and the control logic determines whether the capacitor has finished discharging; and a switching device, coupled to the primary battery set and the backup battery, selecting the primary battery set or the backup battery to provide electricity to the wireless input device.

2. The wireless input device as claimed in claim 1, wherein the primary battery set comprises a first battery and a second battery.

3. The wireless input device as claimed in claim 2, further comprising a power control device;
wherein the power control device is coupled to the first battery and the second battery and outputs electricity of the first battery, and when the first battery does not have sufficient electricity for supply, the power control device outputs electricity of the second battery.

4. The wireless input device as claimed in claim 2, wherein the switching device is a manual switch, when the first battery and the second battery do not have sufficient electricity for supply, the manual switch is switched from a first position to a second position to select the backup battery to provide electricity.

5. The wireless input device as claimed in claim 4, further comprising a driving device; when the manual switch is in the second position and the first battery and the second battery have been replaced by a new primary battery set, the driving device moves the manual switch to switch from the second position to the first position to select the new primary battery set to provide electricity.

6. The wireless input device as claimed in claim 1, wherein the electricity generating device is a piezoelectric material device or an electricity generating motor which generates electricity in response to the clicking/pressing operations to the wireless input device.

7. A power management method suitable for the wireless input device as claimed in claim 1, comprising:
detecting a voltage of the primary battery set;
selecting the backup battery to supply electricity via the switching device when the primary battery set does not have sufficient electricity; and selecting a new primary battery set to provide electricity via the switching device when the backup battery is providing electricity and the primary battery set has been replaced by the new primary battery set.

8. The power management method as claimed in claim 7, further comprising:
coupling a power control device to a first battery and a second battery in the primary battery set;
outputting electricity of the first battery via the power control device; and
outputting electricity of the second battery via the power control device when the first battery does not have sufficient electricity.

9. The power management method as claimed in claim 7, wherein the switching device is a manual switch, and when the primary battery set does not have sufficient electricity, the switching device is switched from a first position to a second position to select the backup battery to provide electricity.

10. The power management method as claimed in claim 9, further comprising:
detecting whether the primary battery set has been replaced by the new primary battery set when the backup battery is providing electricity; and
selecting the new primary battery set to provide electricity by enabling a driving device to switch the switching device, when detecting the primary battery set has been replaced by the new primary battery set.

11. The wireless input device as claimed in claim 1, wherein the energy-storage/charging device further comprises:
a first switch, coupled to two terminals of the capacitor of the integrator, wherein the first switch is formed a short-circuit to clear the remaining electricity within the capacitor according to a control signal of the control logic; and
a second switch, coupled to the integrator, and perform switching between an energy-storage process or a charging process of the energy-storage/charging device.

* * * * *